US009292606B1

(12) United States Patent
Kingman, Jr. et al.

(10) Patent No.: US 9,292,606 B1
(45) Date of Patent: *Mar. 22, 2016

(54) SYSTEM AND METHOD FOR CREATING CUSTOMIZED IP ZONES UTILIZING PREDICTIVE MODELING

(71) Applicant: Semcasting, Inc., North Andover, MA (US)

(72) Inventors: Raymond R. Kingman, Jr., Newburyport, MA (US); Brian K. Rivard, Newbury, MA (US); Daniel V. Ostertag, Tewksbury, MA (US)

(73) Assignee: Semcasting, Inc., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,496

(22) Filed: Aug. 29, 2014

Related U.S. Application Data (63) Continuation of application No. 13/472,528, filed on May 16, 2012, now Pat. No. 8,825,662.

(60) Provisional application No. 61/637,471, filed on Apr. 24, 2012.

(51) Int. Cl.
G06F 17/30 (2006.01)

(52) U.S. Cl.
CPC .... *G06F 17/30864* (2013.01); *G06F 17/30289* (2013.01); *G06F 17/30731* (2013.01)

(58) Field of Classification Search
CPC ................ G06F 17/30017; G06F 17/30212
USPC .................................................. 707/741, 794
See application file for complete search history.

(56) References Cited

U.S. PATENT DOCUMENTS

| 5,251,205 | A   | * | 10/1993 | Callon et al. ............ 370/392 |
| 8,296,180 | B1  |   | 10/2012 | Epperson et al. |
| 2003/0033155 | A1 |   | 2/2003 | Peerson et al. |
| 2010/0048165 | A1 |   | 2/2010 | Caldwell et al. |
| 2010/0121684 | A1 | * | 5/2010 | Morio et al. ............... 705/10 |
| 2011/0184793 | A1 | * | 7/2011 | Bohannon et al. ...... 705/14.14 |
| 2012/0259972 | A1 | * | 10/2012 | Bafna et al. .............. 709/224 |

* cited by examiner

*Primary Examiner* — Pierre Vital
*Assistant Examiner* — Andalib Lodhi
(74) *Attorney, Agent, or Firm* — Loginov & Associates, PLLC; William A. Loginov (57) ABSTRACT

A system, method and computer-readable medium provides steps of merging one or more sources of IP addresses to create a merged database comprising a plurality of IP zones, user typing each of the plurality of IP zones, enhancing each of the plurality of IP zones, receiving an input address and selecting one or more of the plurality of IP zones having a predetermined statistical relationship to the input address.

16 Claims, 11 Drawing Sheets

GENERATE IPS
OUTPUT FORMAT
☑ IPS ☐ IP RANGES ☐ INTEGER RANGES
GENERATE IPS FROM THIS REPORT USING THESE FILTERS:

HUBS
☑ INCLUDE IPS FROM HUBS

LOCATIONS
☑ URBAN ☐ SUBURBAN ☐ RURAL

USER TYPE
☑ HOME ☐ BUSINESS ☐ EDUCATION ☐ GOVERNMENT ☐ WIRELESS

NET WORTH
☑ <$25K ☐ $30K-$75K ☐ $75K-$150K ☐ $150K-$250K ☐ $250K-$500K
☐ $500K-$750K ☐ $750K-$1M ☐ $1M-$2.5M ☐ $2.5M-$5M ☐ >$5M

INCOME
☑ <$30K ☐ $30K-$40K ☐ $40K-$50K ☐ $50K-$60K ☐ $60K-$75K ☐ $75K-$100K ☐ $100K-$125K
☑ $125K-$150K ☐ $150K-$200K ☐ $200K-$250K ☐ $250K-$300K ☐ $300K-$500K
>$500K

DISCRETIONARY INCOME INDEX
☑ 0 ☐ 1-50 ☐ 51-100 ☐ 101-150 ☐ 151-200 ☐ 201-500 ☐ 501-1000 ☐ 1000+

HOME VALUE
☑ <$50K ☐ $50K-$75K ☐ $75K-$100K ☐ $100K-$125K ☐ $125K-$150K ☐ $150K-$175K
☐ $175K-$200K ☐ $200K-$225K ☐ $225K-$250K ☐ $250K-$275K ☐ $275K-$300K ☐ $300K-$350K
☐ $350K-$400K ☐ $400K-$450K ☐ $450K-$500K ☐ $500K-$775K ☐ $775K-$1M ☐ >$1M

ETHNICITY
☐ WHITE
☐ BLACK
☐ HISPANIC
☐ ASIAN
IS AT LEAST 0% ±

POLITICAL PARTY
☑ DEMOCRAT
☐ REPUBLICAN
☐ UNAFFILIATED
☐ OTHER
IS AT LEAST 30% ±

NUMBER OF CHILDREN
☐ ZERO
☑ ONE
☐ TWO
☐ THREE TO FIVE
☐ MORE THAN FIVE
IS AT LEAST 20% ±

GENDERS PRESENT
☐ MALE
☑ FEMALE
☐ BOTH
☐ UNKNOWN
IS AT LEAST 40% ±

INVESTED ASSETS DECILE
☑ 1 ☑ 2 ☑ 3 ☑ 4 ☑ 5 ☑ 6 ☑ 7 ☑ 8 ☑ 9 ☑ 10

CHARITABLE CONTRIBUTIONS DECILE
☑ 1 ☑ 2 ☑ 3 ☑ 4 ☑ 5 ☑ 6 ☑ 7 ☑ 8 ☑ 9 ☑ 10

COMPACT VEHICLE DECILE
☑ 1 ☑ 2 ☑ 3 ☑ 4 ☑ 5 ☑ 6 ☑ 7 ☑ 8 ☑ 9 ☑ 10

COUPE VEHICLE DECILE
☑ 1 ☑ 2 ☑ 3 ☑ 4 ☑ 5 ☑ 6 ☑ 7 ☑ 8 ☑ 9 ☑ 10

LUXURY CROSSOVER DECILE
☑ 1 ☑ 2 ☑ 3 ☑ 4 ☑ 5 ☑ 6 ☑ 7 ☑ 8 ☑ 9 ☑ 10

EXOTIC VEHICLE DECILE
☑ 1 ☑ 2 ☑ 3 ☑ 4 ☑ 5 ☑ 6 ☑ 7 ☑ 8 ☑ 9 ☑ 10

FOREIGN SEDAN DECILE
☑ 1 ☑ 2 ☑ 3 ☑ 4 ☑ 5 ☑ 6 ☑ 7 ☑ 8 ☑ 9 ☑ 10

LUXURY SEDAN DECILE
☑ 1 ☑ 2 ☑ 3 ☑ 4 ☑ 5 ☑ 6 ☑ 7 ☑ 8 ☑ 9 ☑ 10

SUV DECILE
☑ 1 ☑ 2 ☑ 3 ☑ 4 ☑ 5 ☑ 6 ☑ 7 ☑ 8 ☑ 9 ☑ 10

SYSTEM AND METHOD FOR CREATING CUSTOMIZED IP ZONES UTILIZING PREDICTIVE MODELING

RELATED APPLICATIONS

The present Application is a continuation of U.S. patent application Ser. No. 13/472,528, filed May 16, 2012, entitled SYSTEM AND METHOD FOR CREATING CUSTOMIZED IP ZONES UTILIZING PREDICTIVE MODELING, which claims benefit of U.S. Provisional Patent Application Ser. No. 61/637,471, filed Apr. 24, 2012, entitled SYSTEM AND METHOD FOR CREATING CUSTOMIZED IP ZONES UTILIZING PREDICTIVE MODELING, the teachings of each of which application is expressly incorporated herein by reference.

FIELD OF THE INVENTION

This invention is related to marketing systems, and more particularly to marketing systems that target advertising via the internet and methods therefore.

BACKGROUND OF THE INVENTION

In a world where an increasing majority of individuals are online and the business community leverages the Internet as its primary communication vehicle, the efficiency of online advertising is becoming increasingly important. The objectives of online advertising are the same as traditional direct mail, television and even email advertising, specifically, to identify the appropriate audience for a product or service and get a message in front of them in a manner that generates the most return on investment.

In the early days of Internet advertising, one of the most effective ways to reach promising prospects for purchase of goods and services was to simply advertise on sites that attracted a viewership most closely aligned to a target audience. This approach was successful for some time, but online audiences increased and too many individuals began accessing the same national news, sports and entertainment sites. While this was attracting national consumer advertisers, it also tended to increase the demand and as a result it squeezed out the local and regional advertisers.

Advertising (ad) networks began to solve the problem of increasing the pool of unique users/individuals that can be reached across many sites and via many different areas of interest (i.e. the user's particular interests, and what type of content he/she would access on the Internet). Ad inventory was, thus, bundled and resold by ad networks. This centralization of the inventory helped to bring scale to the industry but did essentially nothing to qualify an audience's interests, or make the process more transparent to advertisers.

An advance in online advertising arrived with the introduction of the web browser-based cookie. In order to improve the efficiency of the online experience, cookies are used to short-cut activities such as logging in to individual first party accounts. Publishers of web sites use browser cookies to identify their users or to identify prior visitors and even people who made, or almost made, a purchase from an online store. Cookies became the tool of the trade in the online advertising industry several years ago and have become the standard. Much of advertising online today is cookie-based, often also including a behavioral targeting, cookie based, component.

Three challenges that the industry currently faces can be categorized as Reach, Data Integrity, and Privacy.

Recently, the online ad industry has centralized around an audience targeting methodology in order to increase the effective reach for campaigns to unique users via web-based content. With audience targeting infrastructure ad networks and exchanges centralized, or pooled, cookies can be applied across most publisher web sites. Audience targeting effectively aggregates all the cookie-based traffic into large pools of end users who can be characterized anonymously as ad segments. In a need to aggregate more available inventory cookies are increasingly brokered and resold through data exchanges and data management platforms to third parties for promoting related products and services. The first party relationship between the user and the publisher site has effectively become a commodity that the publishers have started to monetize by placing a cookie on their end users when they visit or transact on the publishers site, and then reselling that association to third parties. The reselling of the cookies through brokers or directly to a third party is currently permissible under industry self-regulating guidelines if the cookie is scrubbed of any personally identifiable information.

An additional reach challenge with cookies is that they are volatile. They can be blocked by the user, be manually deleted from a user's computer, and/or time-out after a period of time. When this happens there is an inability to associate the online user with cookie information, and the ad inventory is reduced or devalued. As the world becomes more digitally complicated and the prevalence of cookies expands, the number and storage of cookies on the browser becomes more volatile and transient. In addition, users with multiple devices or software browsers that access a publisher web site are treated in a manner where each of those entities is a separate user. This increases the cookie pool temporarily. However the number of actual unique users diminishes. At any given time a small minority of the online public will have an active cookie that fits the specific needs of the advertiser. The use of cookies can make the user experience potentially more efficient but the centralization of the ad inventory and the inefficiency of the behavioral targeted cookie to reach qualified audiences at scale is a business challenge.

When a cookie is made available it is almost always based on a minimal number of behavioral data points, and often those data points are inferred. Each cookie can only be differentiated by the data that has been associated with it but the associations that connect a cookie to a segment are often based on information as thin as a site visit, or an individual purchase. Thin data is desirable because there is no current behavioral targeting mechanism to collect the amount of data required to determine whether a user is in the market or can afford the product or service being offered. The data integrity issue is exacerbated because of the persistent lack of qualified and active inventory in each segment. A lack of data integrity reduces the quality of the audience and the effectiveness of the advertising.

The online advertising industry has promoted a self-regulatory policy of notice to users that they are being tracked and corresponding opt-out provisioning at the browser level. Cookies are being actively challenged on privacy concerns because the audience generally does not want their browsing history captured and resold because they want to control which parties have access to their personally identifiable information. The United States FTC, White House, and Industry's Privacy Coalition have recently agreed to a policy of Do Not Track. This policy may be implemented through legislation.

The business challenges and current legislative environment could, thus, force the ad industry and browser manufacturers to reduce complication and allow users to opt-out or to block cookies more transparently and persistently. These market forces will create a greater need for an alternative advertising targeting solution that provides better reach, data integrity and privacy than the existing industry standard of behavioral targeting and cookies.

Thus, it is desirable to provide a system and method that allows the targeting of advertising and marketing information to internet users without the need to track user data or store information related to particular internet users.

SUMMARY OF THE INVENTION

This invention overcomes disadvantages of the prior art by providing a system, method and non-transitory computer-readable medium that uses off-line information with predictive modeling to segment consumers by ISP, user type, demographics, and business attributes in order to create custom audience segments or IP zones that are mapped to online IP Address Ranges. With an IP based system an online audience is defined as an aggregation of individuals and households based on the scope of the IP zone that serves it. The geographic footprint of an IP Zone is, however, not geographic, but rather virtual, based on subdivisions within a zip code, each based on a plurality of demographic of variables. In all cases, any personally identifiable information is absent from the scoring of an IP range in the creation of an IP zone. The precedent of an invitation to apply aggregated data loosely applies because the information used in forming a virtual zone is typically larger than a zip code plus 4 by average count of people and variable is a mean value of each individual demographic variable. Notably, an individual IP Address cannot be tied back to an individual by any means of reverse engineering.

In accordance with an illustrative embodiment, an IP Audience definition system provided herein involves no tracking or placement of cookies. This means that all online users that meet an audience definition are available as inventory. Thus, the potential to reach larger, better qualified audiences based on demographics and consumer interest and purchase data improves, and does so in a more efficient, privacy friendly manner.

In accordance with an illustrative embodiment, an audience IP zone is represented as a set of IP Addresses that are linked to three or more attributes representative of a desired audience, a geographic location and a user type represented as one or more homes, businesses, schools, government institutions, medical facilities, financial or other entity, and the demographic or Firmagraphic descriptive variables that describe the audience. Each zone is defined by multiple demographic, socio-economic, business or product attributes or variables. Each variable is represented as a score for its concentration, value, or affinity to the user type audience is represents. IP zone audiences can be selected by their attributes or compared against one another, modeled, and prioritized by their scores and used to determine the composition of a preferred audience for advertising.

In an illustrative embodiment, the system, method and non-transitory computer-readable medium can comprise merging one or more sources of IP addresses to create a plurality of merged IP addresses. Each of the plurality of merged IP addresses is user-typed. Demographic data is appended to each of a plurality of seed IP addresses. These seed IP addresses are utilized to connect and append demographic information to the plurality of merged IP addresses. A plurality of IP zones are created from the merged IP addresses. An input address is received, and one or more of the plurality of IP zones are selected, where such zones have a statistical relationship to the input address, based upon predetermined selection criteria and/or parameters.

In accordance with an illustrative and non-limiting embodiment, a method includes merging one or more sources of IP addresses to create a merged database comprising a plurality of IP zones, user typing each of the plurality of IP zones, enhancing each of the plurality of IP zones, receiving an input address and selecting one or more of the plurality of IP zones having a predetermined statistical relationship to the input address.

In accordance with another illustrative embodiment, a non-transitory computer-readable medium contains program instructions wherein execution of the program instructions by one or more processors of a computer causes the computer to merge one or more sources of IP addresses to create a merged database comprising a plurality of IP zones, user type each of the plurality of IP zones, enhance each of the plurality of IP zones, receive an input address and select one or more of the plurality of IP zones having a predetermined statistical relationship to the input address.

In accordance with another illustrative embodiment, a method comprises receiving one or more IP zones each having a demographic profile with a predetermined degree of similarity to an input of a marketing entity, identifying an internet communication originating from an IP address and communicating a communication from the input to the IP address if the IP address falls within one of the identified IP zones.

In accordance with another illustrative embodiment, a system for delivering marketing (and/or other web-user-relevant content) includes a plurality of means, including means for receiving one or more IP zones each having a demographic profile with a predetermined degree of similarity to an input of a marketing entity, identifying an internet communication originating from an IP address, and communicating a communication from the input to the IP address if the IP address falls within one of the identified IP zones.

BRIEF DESCRIPTION OF THE DRAWINGS

The general architecture that embodies the implementation of the various features is described in the referenced drawings. The drawings are provided to illustrate the embodiment of the invention but not to limit its scope of application. The invention description below refers to the accompanying drawings, of which.

DETAILED DESCRIPTION

In accordance with illustrative embodiments, there is disclosed a system that uses IP Address data from Internet Service Providers (ISP), including information collected by the ISPs regarding account registrations, network design and performance characteristics of the ISPs, home demographic and business Firmagraphic information, and predictive modeling to improve advertising reach and accuracy while reducing privacy concerns.

Figure 1:
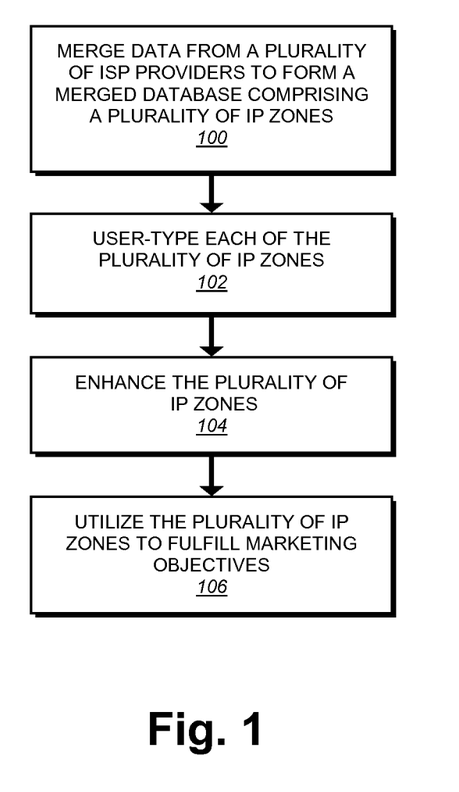
FIG. 1 is a flow diagram of an illustrative embodiment.

According to an illustrative embodiment, shown in overview in FIG. 1, a system is provided for building the IP zone data and applying it in the targeting process for advertising preference selection. The IP zone data can, for example, include descriptive demographics of the Internet user, the attachment of descriptive demographics to an IP zone by weighted value, and the application of ranked IP zone attributes to create a target audience.

As used herein, the term "IP Zone" refers to the range of IP addresses stored in a merged database the derivation of which is described more fully below. In accordance with illustrative embodiments, there are IP addresses assigned for home, business, education, government, and wireless usage. These IP addresses can change assignments periodically or at the discretion of the ISPs. The IP Address data is updated periodically in order to remain current for their assignment values relative to Home, Business, Education, Government or Wireless assignment. In accordance with some illustrative embodiments, the volume of IP addresses does not make it feasible to store each individual address in a database. Therefore the IP addresses are stored in "ranges" that detail the BEGIN and END IP numbers for each range. The approximate geographic location, Internet speed, service provider, and business category, etc., is stored in the merged database for each range, or IP Zone.

In accordance with illustrative embodiments discussed below, a merged database of IP addresses and IP zones is created from various providers of such data. The process of merging results in records associated with each of the plurality of IP zones stored in a uniform format. The merged database next undergoes a process of user typing whereby each IP zone is attributed by user type such as, for example, home, business wireless, etc. In accordance with illustrative embodiments discussed below, home IP zones and business IP zones are further enhanced using offline sources of demographic and Firmagraphic data, respectively. With specific reference to the home IP zones, seed IP addresses, or samples of known individuals are augmented with demographic data gathered from public and private sources. The augmented seed data is then utilized to attribute each of the home IP zones with demographic data at various geographic scales using statistical mechanisms. As described more fully below, business IP zones are likewise augmented and enhanced with Firmagraphic data. Once merged and enhanced, the IP zones are used to facilitate advertising and marketing objectives. In one embodiment, exemplary or sample customer identities are provided by a potential advertiser. Statistical modeling is performed to identify IP zones as having demographic characteristics similar to those of the sample customer identities. The IP zones so identified can then be used to target advertising to individuals navigating the internet.

By way of non-limiting example, a car manufacturer can provide the system with the identity of dozens of buyers of their products. One or more IP zones are identified as representing ranges of IP addresses mapped to home users exhibiting demographic characteristics similar to those of the car purchasers. Then, for example, when a user of a search engine accesses a search page, the IP address of the user is checked to see if it falls within one of the identified ranges. If it does, an advertisement for the car manufacturer is displayed. In this manner, marketing material is effectively targeted at internet users without the need to collect the identity and/or private identifying characteristics of a user.

With reference now to FIG. 1, there is shown a high-level overview of an illustrative embodiment of the method/process for creating customized IP zones described more fully below. At step 100, a data merge is performed whereby IP address data is sourced for merging from a plurality of ISPs and merged to form a merged database having a plurality of IP zones. Each of these ISPs includes virtually identical coverage of IP Addresses but has applied different techniques of network analysis to segregate and designate IP range mappings. Each of these ISP data sources provide updates on a quarterly basis. Owing to the differences in the format by which each of the plurality of ISPs provide data, the data merge is performed to create a unified database having a single format.

Figure 3:
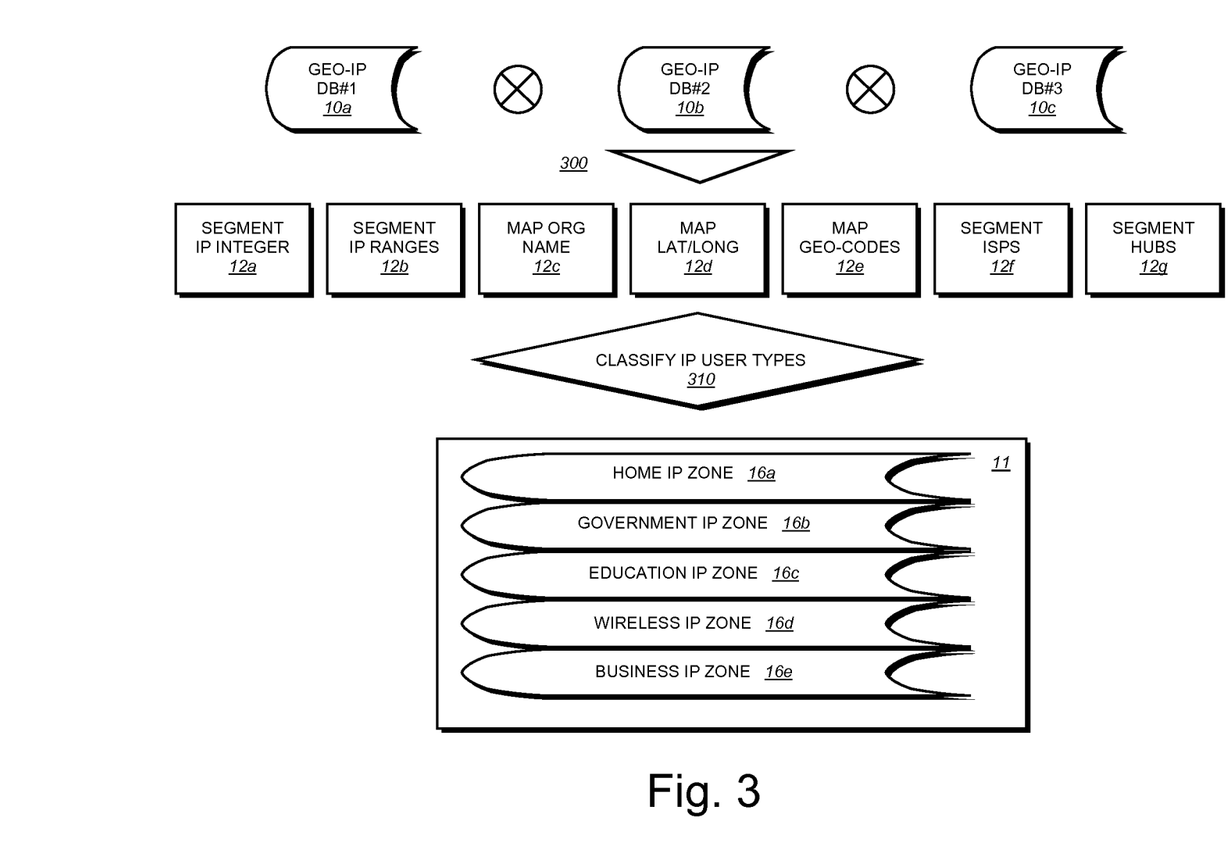
FIG. 3 is a schematic diagram depicting an illustrative embodiment of elements and steps involved in using data from Internet Service Providers to build out User Type designations and apply them to the creation of IP zones.

With reference to FIG. 3, there is graphically illustrated the merging of a plurality of Internet Service Provider (ISP) databases 10. Each ISP database 10 is illustrated as a Geo-IP database. At a minimum, for each entry in ISP database 10 there is an IP address capable of being mapped to an IP zone 16a-e. In one embodiment, each ISP database 10 has IP zones 16a-e mapped to approximate geographic locations with some of the ranges being at the zip code level and other ranges that default to state, regional, or unknown locations. In addition to approximate location, where known, providers append ISP identifications, Domain Name, Organization, network speed and the like. Ranges are stored in the resulting merged database 11 in both IP Address form and in IP Integer format. There is no association of an IP Address to an individual or to any personally identifiable information by the plurality of ISP data providers.

In an illustrative embodiment, once merged, at step 300, each record in the resulting merged database 11 includes one or more IP zones 16a-16e wherein, for each IP zone 16a-e, there is associated one or more IP address descriptors 12a-12g or information from which IP address descriptors can be derived. As illustrated, IP address descriptors 12 can include, but are not limited to, a segment IP integer 12a, segment IP ranges 12b, map org name (map organization name) 12c, map lat/long (latitude/longitude coordinates) 12d, map geo-codes 12f, segment ISPs 12e and segment hubs 12g.

With continued reference to FIG. 1, at step 102, each of the IP zones in the merged database undergoes user typing whereby each IP zone is assigned a type classification. With reference once again to FIG. 3, there is illustrated, at step 310, classifying each record in the merged database into one of a plurality of zone types 16. In an illustrative embodiment, IP zone types include, but are not limited to, a home IP zone 16a, government IP zone 16b, education IP zone 16c, wireless IP zone 16d and business IP zone 16d. A variety of additional or alternate IP zone types can be provided to provide further specialization and/or granularity to the system. These types zones can be used in particular applications for the system and method herein.

With continued reference to FIG. 1, processing continues at step 104 whereat the user typed IP zones records in the merged database 11 are enhanced with additional demographic and Firmagraphic data. In accordance with an illustrative embodiment, home IP zones 16a are enhanced via a process of modeling seed IP addresses for use in appending demographic data to the home IP zones 16a in the merged database 11.

Figure 4:
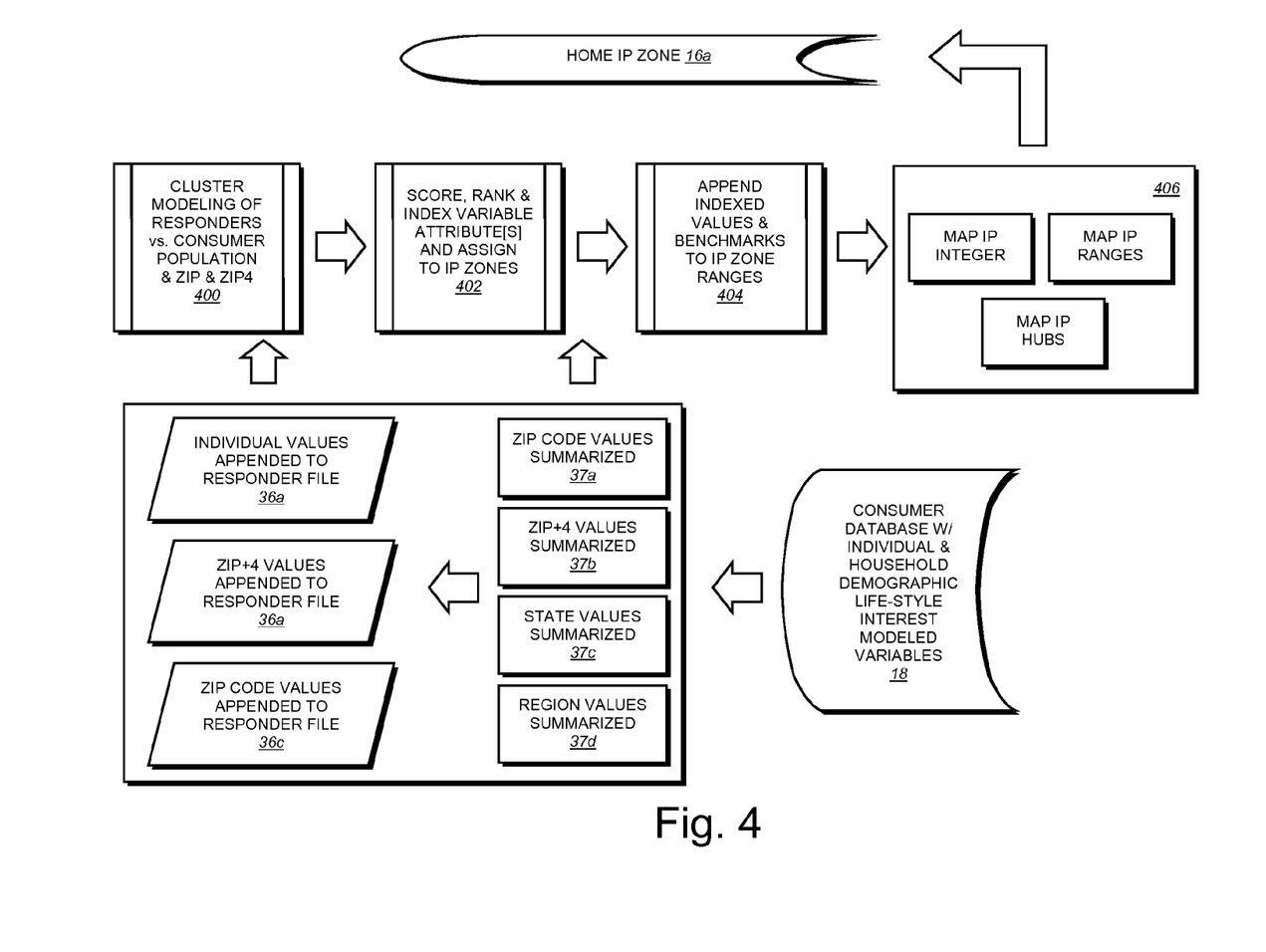
FIG. 4 is a block diagram depicting an illustrative embodiment of elements and steps involved in mapping individual demographic and Firmagraphic data to a home IP Zone.

With reference to FIG. 4, there is shown an illustrative embodiment of enhancing home IP zones 16a-e. As illustrated, the process begins with consumer database 18. Consumer database 18 is comprised of one or more records each including, at least, an identifier of an individual and at least one demographic variable associated with the individual.

Figure 2:
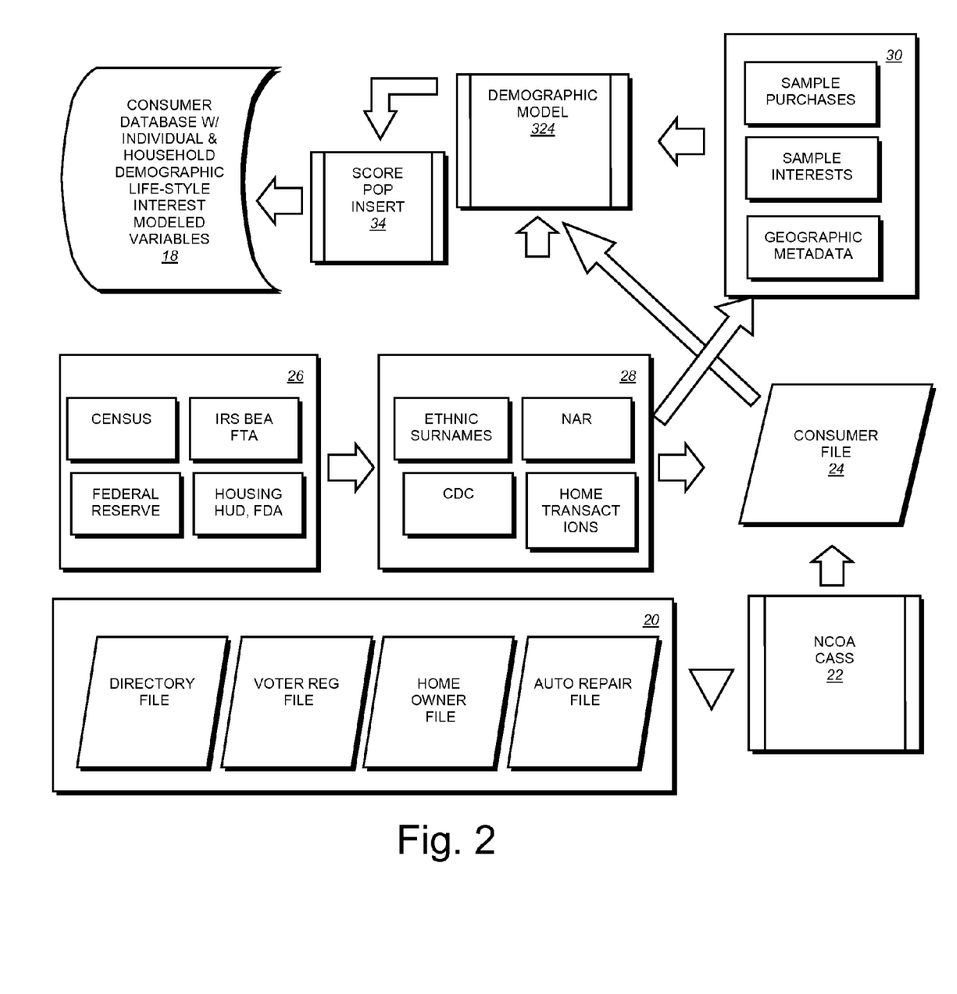
FIG. 2 is a block diagram depicting an illustrative embodiment of elements and steps involved in building offline demographic, socio-economic and other entity segments through the application of predictive modeling according to an illustrative embodiment.

With reference now to FIG. 2, there is shown an illustrative embodiment of the method by which consumer database 18 can be formed. Specifically, there is illustrated deriving consumer database 18 from publicly available data sources and the extension of that data through an application of predictive modeling. Household and individual names and addresses forming raw identifiers 20 are sourced from, for example, directories, voter registration files, home transactions, auto repair records and the like and are updated for accuracy through National Change of Address (NCOA) and Coding Accuracy Support System (CASS) 22 to produce consumer file 24.

Likewise, data can be derived from government data sources 26 of publicly available information at the geographically summarized level, for example, the Census, Bureau of Economic Analysis, HUD, Employment Development, Federal Reserve, Department of Transportation, IRS, etc., to align demographic values with locations, individuals, and household through statistically modeling. Data is further derived from various private data sources 28 including, but not limited to, ethnic surname files, National Association of Realtors (NAR), home transaction files and the like. As illustrated, the government data sources 26 and private data sources 28 are likewise merged with consumer file 24.

In an illustrative embodiment, government data sources 26, private data sources 28, consumer file 24 and transactional data sources 30 serve as input to produce a demographic model 32 of consumers. In an illustrative embodiment transactional data sources 30 include, but are not limited to, data acquired from individual transactions or geographically summarized metadata 30 to acquire goods or services. In accordance with an illustrative embodiment, demographic model 32 rank orders households and individuals of consumers to create a scored population 34 with the results outputted as a variable-enhanced consumer database 18. Note that while the elements of FIG. 2 generally represent various forms of currently available/accessible information and/or data, the illustrative embodiment uniquely employs this diverse information set to generate the novel IP Zones described herein.

With continued reference to FIG. 4, the consumer database 18 described above serves as an input to an exemplary method whereby data comprising seed IP addresses populating responder file 36 are appended with demographic data. The responder file 36 is illustrated herein as being separately delineated responder files 36a-36c each in a different exemplary state of being when appended with additional information. As used herein, "seed data" refers to data that associates a specific zip+4 with a specific IP address. As used herein, a "seed IP address" refers to a known IP address with an associated location identifier. Such an associated location identifier can take the form of an address, a lat/long designation and the like. Seed data comes from a variety of sources including online purchases and registrations. Seed data contains no other information than zip+4 and IP Address. There are no names, transaction information, or any personally identifiable attributes associated with the seed addresses of consumers.

As illustrated, the large volume of records in consumer database 18 is aggregated and summarized for each demographic variable at different geographic scales such as, for example, zip code level 37a, zip+4 level 37b, state 37c, region 37d, and the like to form summarized data. Once summarized, the summarized data 37a-d is appended to responder file 36. In accordance with an illustrative embodiment, for each demographic variable, benchmarks are calculated for each location against the equivalent values of local (zip code), regional (zip3), state, and national geographies.

As described below, uploading these seed files into the merged database 11, the records of responder file 36 can be mapped to the discrete IP zone (16a-e) into which a specific IP address falls. When IP addresses are mapped to an IP zone 16a-e they are associated with the summarized zip+4 or zip code demographics as weighted values based on a series of matching criteria. IP zones 16a-e inherit the summarized demographic score of the zip+4 when it is combined with the pre-calculated zip code scores to create a weighted average. IP zones 16a-e that do not map to the seed data are assigned zip code level demographic values. IP zone demographic attributes are uploaded into merged database 11 where they are used to calculate values for the zip code, the county, regional and national benchmarks.

Specifically, in accordance with an illustrative embodiment, at step 400, responder file 36 serves as the input for cluster modeling each responder, or seed IP address, versus the appended consumer population data, zip code and zip+4 level data. More specifically, application of predictive modeling technology summarizes zip+4 and zip code values. The modeling of summarized values prioritizes the IP Zone clusters for the relative concentration of values in a range versus all other ranges. In accordance with another illustrative embodiment the IP zone system separates apart residential locations into virtual clusters based on individuals and households with similar affluence, life-stage, ethnic origin and interests. These overlay clusters are then grouped onto recognized zip code geographic footprints as an aggregation of IP Zone clusters. The effect of applying clustering refines the audience of each zip code into multiple segments or IP Zones.

At step 402, the summarized values utilized to model the demographic characteristics of each zone against the local, regional, state and national values are utilized to create a raw score for each IP zone 16a-e for each demographic variable. These raw scores are ranked and indexed and stored as a table with a projected count of individuals within the zip+4 and zip code based on a statistical projection of the known zip code population and the count of IP addresses in an IP Zone. In an illustrative embodiment, all individuals within a zone are defined as having the same raw score. Benchmark scores for each IP zone 16a-e are also computed and stored in the table for comparative purposes and are later applied in the audience definition application described more fully below.

At step 404, the indexed raw scores and benchmarks are appended to each of the IP zones 16a-e in merged database 11 and, at step 406, are associated with each IP zone's 16a integer, range and hub information resulting in the enhancement of the home IP zones 16a in merged database 11.

Figure 5:
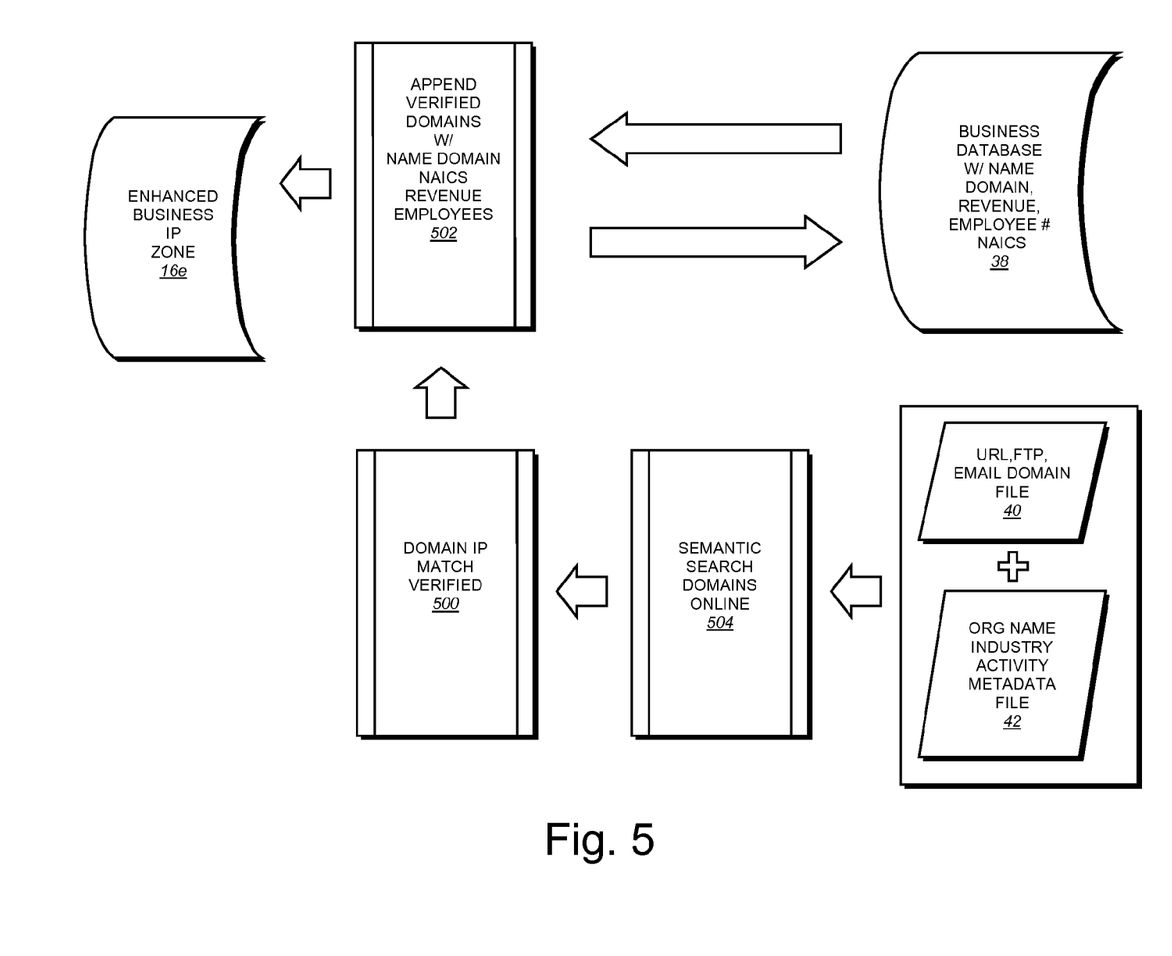
FIG. 5 is a flow diagram depicting exemplary elements and steps involved in enhancing and assigning value to a business IP zone based, in part, on the application of offline business Firmagraphic data.

With reference to FIG. 5, there is illustrated in illustrative embodiment fashion, a process of enhancing business IP zones 16e based, in part, on the application of offline business Firmagraphic data. In an illustrative embodiment, the business Firmagraphic information is incorporated by matching each business IP Zone 16e to the domain, ISP and organizational name stored in business database 38 and appending third party business Firmagraphic information for NAICS codes, SIC codes, revenue, employees and location to the business IP zone 16e.

IP network data files provide a minority percentage of records with an ISP, organization, or the domain name associated with the IP range. In the case where the ISP, organization and zip code are available the records are matched to the business information and the Firmagraphic attributes are appended to the records.

Specifically, at step 500, IP domain names, or "domains", are verified for location and ISP hosting accuracy through DNS services. Next, at step 502, verified domains are appended with Firmagraphic data such as, for example, business name, revenue, number of employees, North American Industry Classification System (NAICS) code, SIC code, etc. and utilized to enhance and attribute business IP zone 16a-e with Firmagraphic data.

In an illustrative embodiment, the system executes a series of online look-ups of the domain to confirm the business identity and record the zip code, ISP and IP address of the domain host. As illustrated, in an illustrative embodiment, a verified domain file 40 containing URL, FTP and email data associated with domains is merged with business metadata file 42 containing organization name, industry and activity data. The resulting merged data is subjected, at step 504, to an online semantic search of the domain names contained therein with the output used as the input to step 500 whereat the IP domains are verified for accuracy. As described above, once verified, the verified IP domains are appended with Firmagraphic data at step 502 and utilized to enhance each business IP zone 16a-e entry in the merged database 11.

In accordance with various embodiments, the system uses a classification system based on key words matching organizational name and Firmagraphic data to classify NAICS codes and SIC codes. For example, the classification system performs a series of look-ups against a proprietary key word list that describes medical services and medical professions and designations. The IP ranges for hospitals, pharmaceutical companies, medical centers, doctors' offices, and clinics can be classified and mapped to their appropriate NAICS code. Once classified by NAICS code the code is mapped to SIC code through a proprietary category matching process and SIC codes are appended to the file.

While the enhancement of home IP zone 16a and business IP zones 16e have been described in detail, it is understood that any and all categories of IP zones 16a-e including, but not limited to, government, education and wireless can be likewise be enhanced in a similar fashion such as by appending demographic data as some locations contain multiple categories of IP Zone types such as an educational institution, homes, and businesses. In accordance with various other illustrative embodiments, various demographic attributes can be derived and appended to IP zones 16a-e. For example, census data indicative of population density can be utilized to create a derived attribute such as "urbanicity" indicative of a relative degree of urban characteristics associated with a location of an IP zone 16a-e.

With continued reference to FIG. 1, at step 106, with each IP zone 16a-e having been user typed and enhanced with demographic and Firmagraphic data, the IP zones 16a-e are used to fulfill marketing and advertising objectives.

Figure 6:
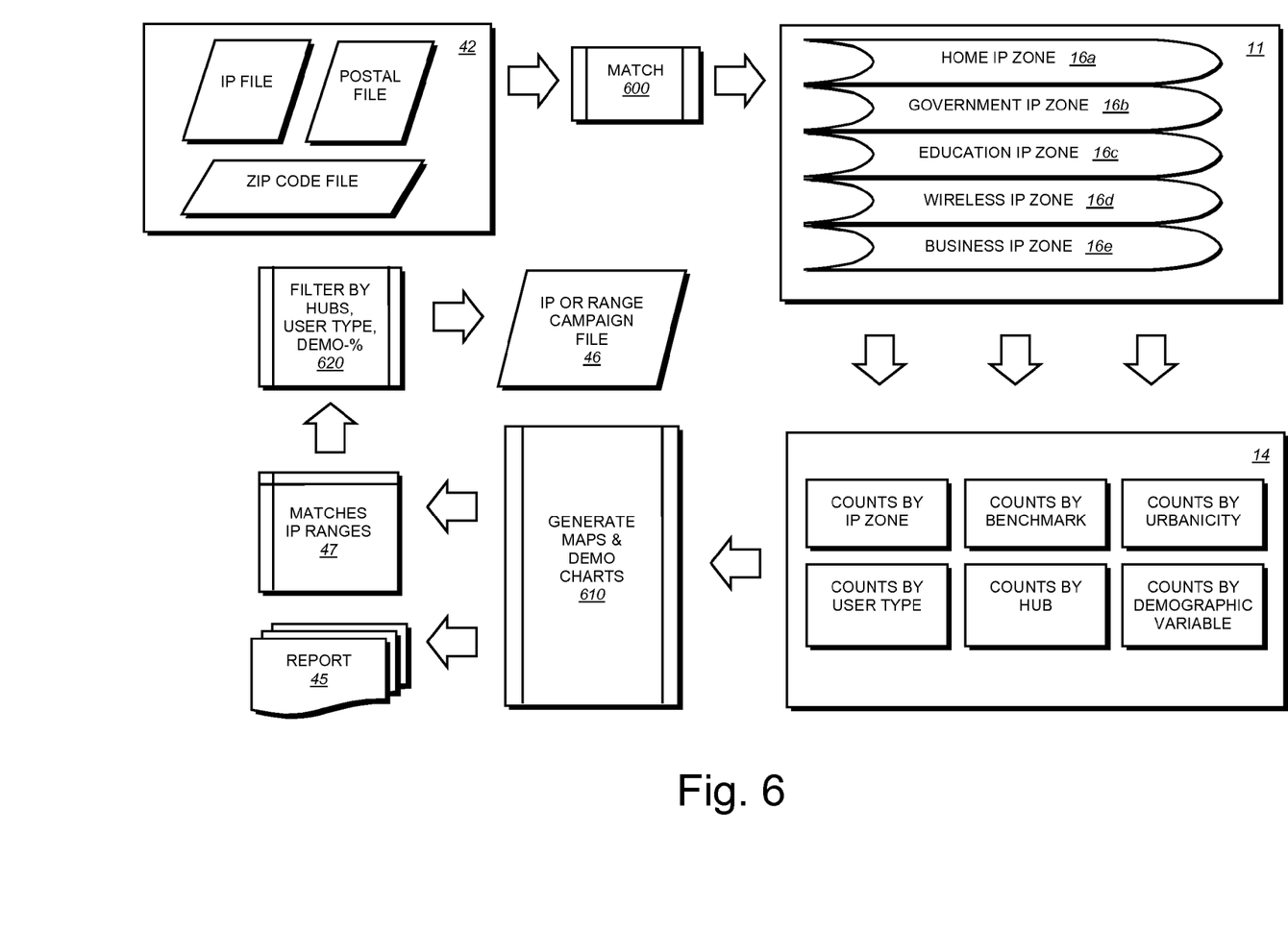
FIG. 6 is a flow diagram depicting exemplary elements and steps involved in mapping advertiser supplied IP Addresses and/or customer physical addresses with the assigned values of IP zones and producing an audience based on an advertiser request.

With reference to FIG. 6, there is shown an illustrative embodiment of the system wherein advertisers apply IP Zones 16a-e in the design and fulfillment of marketing and advertisement objectives. As depicted, the system receives marketing input 42 in the form of IP address lists, postal lists and the like and, at step 600, and matches postal lists or IP Address lists to the IP zones 16a-e in merged database 11 to determine the demographic and Firmagraphic profiles of the IP zone 16a-e locations that are consistent with the received input. As depicted, once the relevant IP zones 16a-e are determined at step 600, the population of the matched IP zones 16a-e are compared graphically to the stored benchmarks returning the overall demographics of the matched IP zones 16a-e, indicating the composition and distribution of the audience and where the best opportunity exists to target a similar audience.

In an illustrative embodiment, count generation data 44 is computed for each of the matched IP zones 16a-e. Specifically, counts for matched IP Zones 16a-e and the number of IP Addresses associated with those zones are computed from projections described in the above description relating to Step 402. As illustrated, computed count types include, but are not limited to, are IP zones 16a-e, benchmarks, "urbanicity", user type, hub, demographic variables, and the like.

In accordance with an illustrative embodiment, once the counts are computed, count generation data serves as an input to step 610 whereat graphical geographic maps and charts are generated of demographic data, benchmark data and various demographic and Firmagraphic data. In an illustrative embodiment, maps are generated for the top zip code locations for each user type to illustrate where the addresses are most concentrated. Key variables graphically illustrate affluence, ethnicity, auto and political preference of each of the matched IP Zones and are compared against the benchmarks in order to inform advertisers on important trends.

As shown, generated maps and charts can be exported for review as one or more reports 45 in an electronic format including, but not limited to, Portable Document Format (PDF). As further illustrated, matching IP zones 47 from step 600 can be filtered at step 620 such as by hub, user type and demographic attributes and output as an IP range campaign file 46. IP range campaign file 46 can then be utilized to further advertising and marketing objectives.

Figure 7:
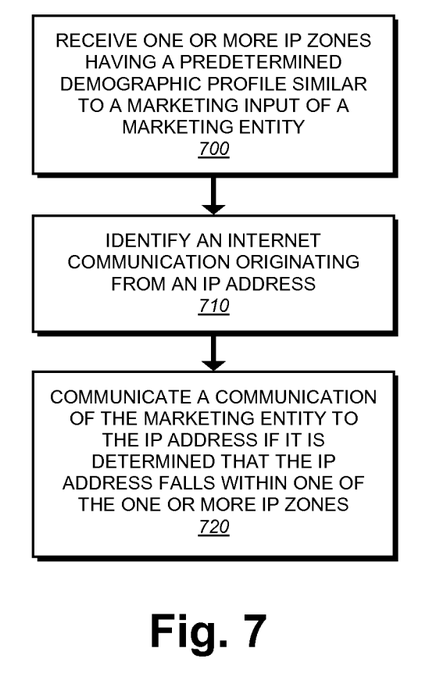
FIG. 7 is a flow diagram of an illustrative embodiment of a method utilizing identified IP zones to target communications from a marketing entity to an IP address.

With reference to FIG. 7, there is shown an illustrative embodiment of a flowchart whereby IP range campaign file 46 is utilized to further advertising and marketing objectives. At step 700, there is received one or more IP zones 16a-e having a predetermined demographic profile similar to a marketing input from an entity, such as a business, individual or any entity desiring to market or advertise a good or service. The degree of similarity can be expressed as a statistical similarity using any well-known method of assessing the similarity or correlation of multi-vector data. As described above, the one or more IP zones 16a-e can be in the form of IP range campaign file 46. At step 710, an internet communication originating from an IP address is identified. The internet communication can include, but is not limited to, a request for access to a web page such as one upon which advertising is displayed. At step 720, a communication of the marketing entity, such as an advertisement, is communicated to the IP address if it is determined that the IP address falls within one of the IP zones 16*a-e*. The communication can include, but is not limited to, an advertisement forming a part or all of a web page, and email or the like where the publisher domain is identified, the advertising is encoded by type, and the size of the advertisement is communicated to the ad server. In an illustrative embodiment the communication can take to the form of redirecting an internet session originated from the IP address to a targeted destination selected by the marketing entity. In this manner, individuals browsing the internet are advantageously provided with access to marketing and advertising materials of likely interest to them without access to private or personal information of the individual.

Figure 8:
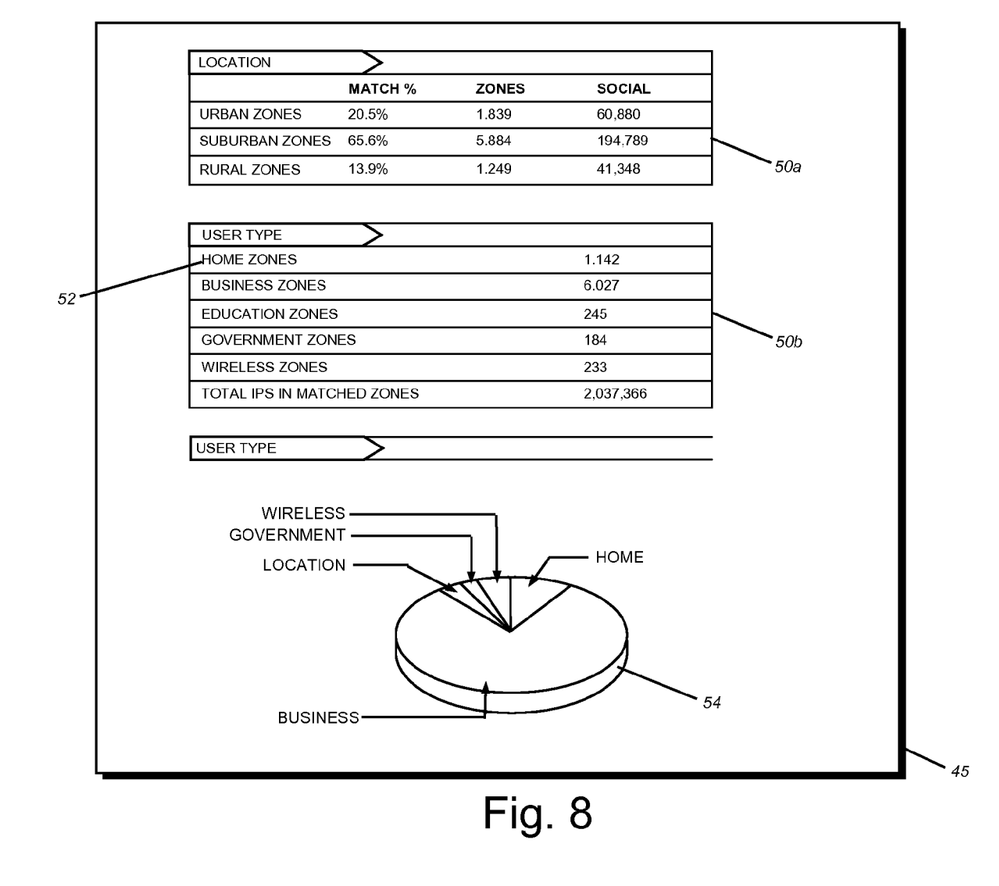
FIG. 8 is an illustration of an output of marketing information according to an illustrative embodiment.

With reference to FIG. 8, there is shown an illustrative embodiment of a report 45 such as can be produced, received and displayed, such as by a marketing entity in the course of producing IP range campaign file 46 in response to marketing input 42. As illustrated, there tables 50*a*, 50*b* and graph 54 provide visual indicia of the composition of IP zones 16*a-e* and attendant attributed data comprising IP range campaign file 46. Each table 50*a*, 50*b* contains a plurality of entries 52. For example, table 50*a* illustrates the breakdown, in terms of percentage and absolute number, of the composition of matching IP zones 16*a-e* by the attribute of "urbanicity" as indicated by urban, suburban and rural zone descriptors. Similarly, table 50*b* illustrates the total number of each matching IP zone 16*a-e* by user type as well as the total number of IP addresses in all of the matching IP zones 16*a-e*. A subset of the data displayed in table 50*b* is further displayed in pie graph form at graph 54. While illustrated in exemplary form as static, each entry 52 and other graphic indicia including, but not limited to, graph 54, can operate as a link, such as a hypertext link, to further information such as can comprise additional reports 45 when displayed on a display device such as a computer screen.

Figure 9:
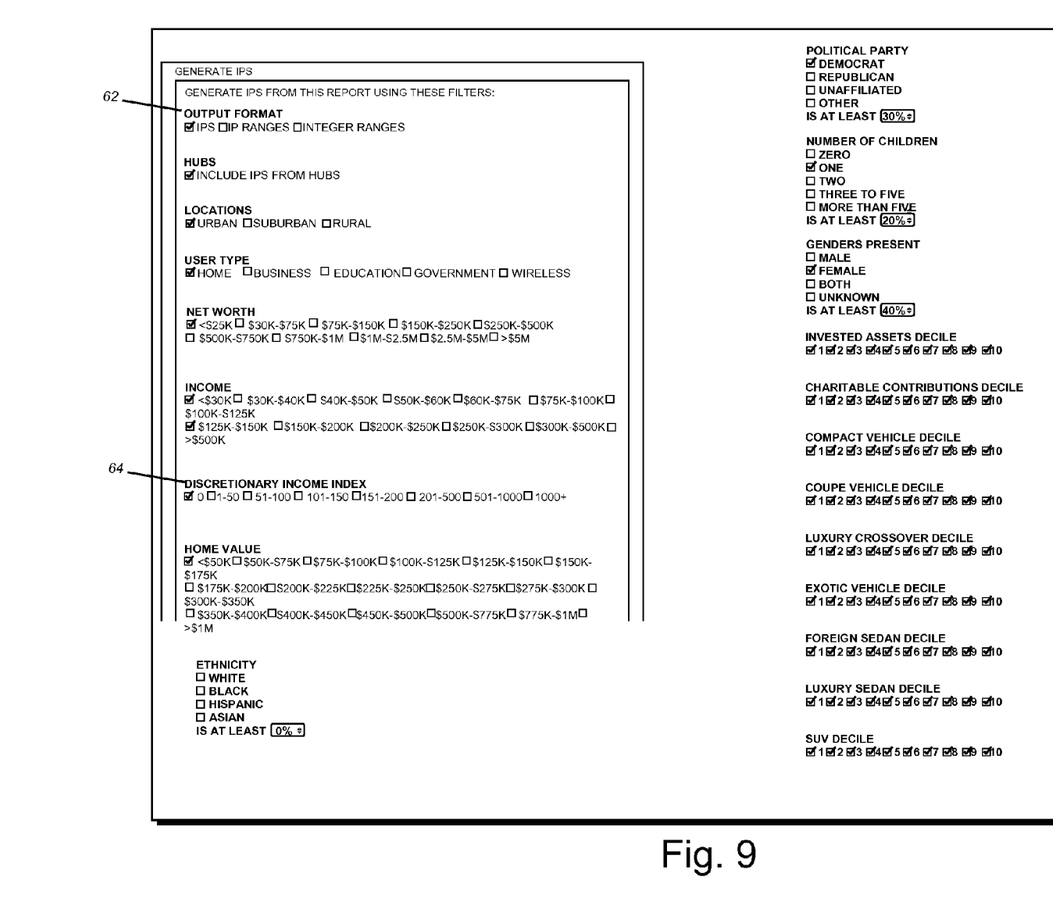
FIG. 9 is an illustration of a graphical user interface (GUI) for use with a client computer according to an illustrative embodiment.

With reference to FIG. 9, there is shown an alternate embodiment of a graphical user interface (GUI) 60 via which a marketing entity using a client computing device can refine the marketing output file 46 in order to prioritize the final campaign file by the attributes that are most desirable to target. As illustrated, a series of exemplary radio buttons allows for the selection of a desired output format 62. For example, selecting the radio button corresponding to "IP Ranges" results in the creation of a range of IP Addresses in traditional dotted decimal notation. By comparison "IP Integer Ranges" format creates IP Addresses converted into integer format for ease of computation by the ad servers. A marketing entity can utilize one or more exemplary demographic selectors 64 to define the demographic composition of the target audience for the campaign. For example, as illustrated, a marketing entity can define desired discretionary income indices for a target audience. The information defined via GUI 60 can be transmitted, such as via the internet, to a server whereat the data and selections defined in GUI 60 form the refined and prioritized audience profile and the output for accessing that audience for a marketing campaign. It should be clear that this GUI can be varied or substituted with a variety of differing types, styles and arrangements of interfaces having one or more separate windows/pages accessible by a user to perform desired interface functions. The design and implementation of such GUI displays should be clear to those of skill in the art.

Figure 10:
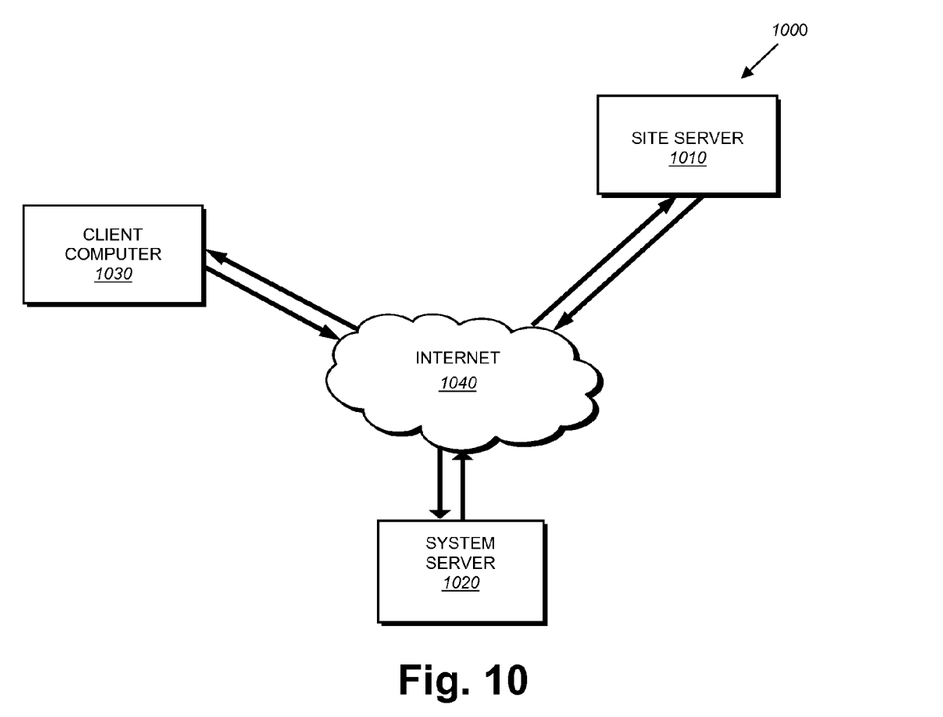
FIG. 10 is a diagram of an exemplary and non-limiting system architecture for performing illustrative embodiments discussed herein.

With reference to FIG. 10, there is shown a simplified, exemplary arrangement for a networked system of computing devices/processors 1000 that enables practice of the embodiments described above. As shown, a client-server system is provided, by way of example, for managing the creation of merged database 11, receiving requests from marketing entities in the form of, for example, marketing input 42 and outputting data including reports 45 and IP campaign files 46 for use by marketing entities and third party entities such as site server 1010.

A marketing entity utilizing, for example, client computer 1030 communicates, via internet 1040 with a system server 1020 and a site server 1010. For example, client computer 1030 can be utilized to communicate via a GUI 60 marketing input 42 to system server 1020 for the purposes of receiving generated reports 45 and IP range campaign files 46. As illustrated, system server 1020 operates to manage functionality related to, but not limited to, the creation and maintenance of merged database 11, the matching of marketing input 42 to IP zones 16*a-e* within merged database 11 and any and all other functionality described above with reference to IP zones 16*a-e*.

Site server 1010 can host a website visited by individuals associated with IP addresses falling within IP zones forming a desired and identified target audience of the marketing entity. For example, site server 1010 can host an automobile website. When a visitor to the site server 1010 having an IP address falling within an identified IP zone as discussed above visits the site, site server 1010 generates an advertisement provided by the marketing entity and displays the advertisement in the HTML code (for example) returned to the visitor.

Figure 11:
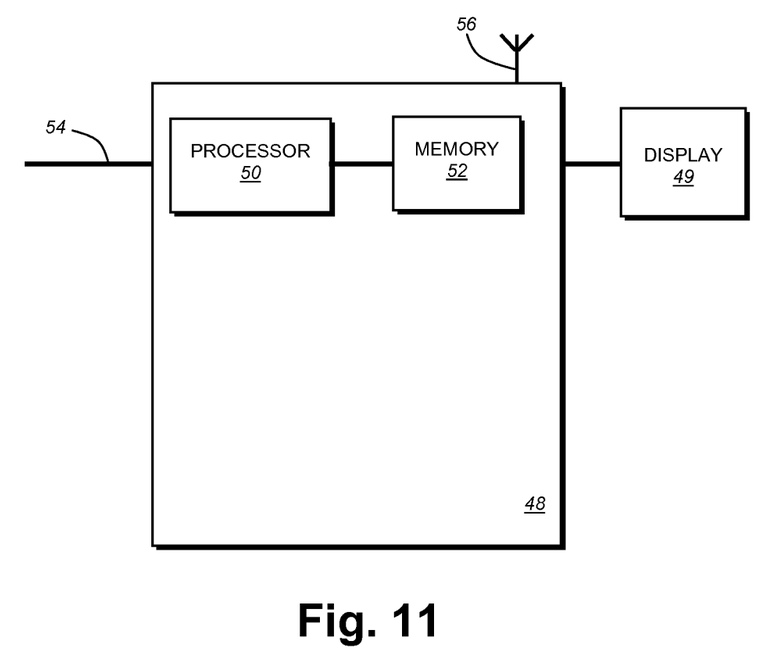
FIG. 11 is a block diagram of a computing and/or processing device for performing illustrative embodiments discussed herein.

With reference to FIG. 11, there is illustrated a device 48 in accordance with illustrative embodiments disclosed herein. Specifically, device 48 can operate as any or all of client computer 1030, system server 1020 and site server 1010. The device 48 includes a processor 50 according to any of the embodiments described herein. For example, the processor 50 might be comprised of a host processor, a co-processor, and/or a memory unit for storing instructions and/or data required to perform any of the functions of any of the steps described or otherwise illustrated above with respect to, for example, creating merged database 11, performing user-typing, enhancing IP zones 16*a-e* and fulfilling marketing objectives. In addition to an internal memory, the processor 50 can additionally be in communication with memory 52 comprised of, for example, RAM memory for storing instruction and/or data such, for example, merged database 11.

Device 48 comprises at least one input/output (I/O) 54 for communicating, for example, with a network such as internet 1040. Device 48 can likewise comprise a communication means 56. Communication means 56 can be, for example, an antenna or a wired communication link for transmitting and/or receiving data. Device 48 can further comprise a display device 49 operating to both display data and to receive, such as via a GUI 60, data from a user.

A control system, as that term is used herein, can be a computer processor coupled with an operating system, device drivers, and appropriate programs (collectively "software") with instructions to provide the functionality described for the control system. The software is stored in an associated memory device (also referred to as a "non-transitory computer readable medium" of program instructions). While it is contemplated that an appropriately programmed general purpose computer or computing device can be used, it is also contemplated that hard-wired circuitry or custom hardware (e.g., an application specific integrated circuit (ASIC)) can be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors typically used in both client and server computing devices include, but are not limited to, the Intel Corporation XEON and PENTIUM processors and/or the AMD Corporation ATHLON processor.

The term "computer-readable medium" refers to any non-transitory medium that participates in providing data (e.g., instructions) that can be read by a computer, a processor or a like device. Such a medium can take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media can include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read. The terms "computer-readable memory" and/or "tangible media" specifically exclude signals, waves, and wave forms or other intangible media that can nevertheless be readable by a computer.

Various forms of non-transitory computer readable media can be involved in carrying sequences of instructions to a processor. For example, sequences of instruction (i) can be delivered from RAM to a processor, (ii) can be carried over a wireless transmission medium, and/or (iii) can be formatted according to numerous formats, standards or protocols. For a more exhaustive list of protocols, the term "network" is defined below and includes many exemplary protocols that are also applicable here.

It will be readily apparent that the various methods and algorithms described herein can be implemented by a control system and/or the instructions of the software can be designed to carry out the processes of the present invention.

Where databases are described, it will be understood by one of ordinary skill in the art that (i) alternative database structures to those described can be readily employed, and (ii) other memory structures besides databases can be readily employed. Any illustrations or descriptions of any sample databases presented herein are illustrative arrangements for stored representations of information. Any number of other arrangements can be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases can, in a known manner, be stored locally or remotely from a device that accesses data in such a database. Furthermore, while unified databases can be contemplated, it is also possible that the databases can be distributed and/or duplicated amongst a variety of devices.

Communication among computers and devices can be encrypted to insure privacy and prevent fraud in any of a variety of ways well known in the art. By way of useful background information, appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, relevant portions of which are incorporated herein by reference.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein can be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms can be stored and transmitted using a variety of media (e.g., computer readable media) in a number of manners. In some embodiments, also noted below, hard-wired electronic circuitry or custom electronic hardware can be used in place of, or in combination with, software instructions for implementation of the processes of various embodiments. Thus, embodiments are not limited to any specific combination of hardware and software.

It should be clear that the above-described system, method and non-transitory computer-readable medium provides a highly advantageous and efficient vehicle for targeting advertising to very specific demographic groups and market segments in a manner that is private and reliable. It avoids the disadvantages of cookies and/or other client-stored data tags and ensures that personal data from a client is not needed 9 or desired) to deliver ad content thereto. Moreover, this system and method allows for highly valuable demographic data to be generated and stored in a manner that is free of any need to obtain it from private individuals. This system, method and computer-readable medium is readily employed by client advertisers (and others) to achieve their marketing goals.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while the content typically delivered to client web-users based upon IP zones is marketing content, this term should be taken broadly to include other web-user-relevant/specific content including alerts, public interest information, political information, and the like. In addition, while the illustrative embodiment refers to a network environment structured around TCP/IP as a communication protocol, it is expressly contemplated that other protocols can be substituted. For example, the teachings of this description can be adapted to operate using IP v6 using skill in the art. Likewise, other protocols, that are or may be adopted in the future can be adapted to generate "IP" zones (the term herein being taken broadly to include other protocols) where those protocols employ numeric, alphanumeric, alphabetical and/or otherwise symbolic) addresses that can be resolved with respect to the location (or other relevant characteristics) of the user. It is also expressly contemplated that any of the processes, procedures and/or method steps described herein can be performed using electronic hardware, software consisting of a non-transitory computer-readable medium of program instructions, or a combination of hardware and software. Likewise various processes and/or steps described herein can be combined or separated into different groups of sub-steps to carry out the functions of the various embodiments. Where used, a "means" can include various combinations of all or part of the structural and/or functional blocks described and depicted herein. Accordingly, this description is meant to be taken only by way of example, and not to otherwise limit the scope of this invention.

What is claimed is:

1. A method for generating IP zones comprising the steps of:
   merging one or more sources of IP addresses to create a merged database comprising a plurality of IP zones;
   classifying each of the plurality of IP zones into a respective user type classification;
   generating a variable-enhanced consumer demographic database by creating a scored population from a plurality of data sources;
   aggregating and summarizing the variable-enhanced consumer demographic database for each of a plurality of demographic variables at a plurality of distinct geographic scales to form summarized geo-demographic consumer data;
   appending seed data with the summarized geo-demographic consumer data to form appended seed data, the seed data comprising at least one IP address;
   mapping the appended seed data to a corresponding one of the plurality of IP zones;
   associating at least one geo-demographic variable of the appended seed data with the corresponding one of the plurality of IP zones for at least one of the plurality of distinct geo-demographic scales to generate one or more enhanced IP zones; and
   selecting one or more of the plurality of enhanced IP zones having a predetermined statistical relationship to an input address.

2. The method of claim 1 further comprising utilizing one or more of the plurality of enhanced IP zones having a predetermined statistical relationship to the input address to realize a marketing objective.

3. The method of claim 2 wherein realizing the marketing objective comprises:
   identifying one or more IP zones each having a demographic profile with a predetermined degree of similarity to a marketing input;
   identifying an internet communication originating from an IP address; and
   communicating a communication to the IP address if the IP address falls within one of the identified IP zones.

4. The method of claim 3 wherein the communication is an advertisement.

5. The method of claim 1, further comprising receiving the input address comprising at least one of an IP address and a postal address.

6. The method of claim 5, wherein receiving the input address comprises receiving the input address from a user.

7. The method of claim 1, wherein the user type classification comprises at least one of home, business, government, education, and wireless.

8. The method of claim 1, wherein the plurality of data sources comprise demographic and/or firmagraphic data.

9. A non-transitory computer-readable medium containing program instructions wherein execution of the program instructions by one or more processors of a computer causes the computer to:
   merge one or more sources of IP addresses to create a merged database comprising a plurality of IP zones;
   classify each of the plurality of IP zones into a respective user type classification;
   generate a variable-enhanced consumer demographic database by creating a scored population from a plurality of data sources;
   aggregate and summarize the variable-enhanced consumer demographic database for each of a plurality of demographic variables at a plurality of distinct geographic scales to form summarized geo-demographic consumer data;
   append seed data with the summarized geo-demographic consumer data to form appended seed data, the seed data comprising at least one IP address;
   map the appended seed data to a corresponding one of the plurality of IP zones;
   associate at least one geo-demographic variable of the appended seed data with the corresponding one of the plurality of IP zones for at least one of the plurality of distinct geo-demographic scales to generate a plurality of enhanced IP zone;
   select one or more of the plurality of enhanced IP zones having a predetermined statistical relationship to an input address.

10. The computer-readable medium of claim 9 further comprising causing the computer to utilize one or more of the plurality of enhanced IP zones having a predetermined statistical relationship to the input address to realize a marketing objective.

11. The computer-readable medium of claim 10 wherein causing the computer to realize the marketing objective further comprises causing the computer to:
   identify one or more IP zones each having a demographic profile with a predetermined degree of similarity to a marketing input;
   identify an internet communication originating from an IP address; and
   communicate a communication to the IP address if the IP address falls within one of the identified IP zones.

12. The computer-readable medium of 11 wherein the communication is an advertisement.

13. The computer-readable medium of claim 9, further comprising causing the computer to receive the input address comprising at least one of an IP address and a postal address.

14. The computer-readable medium of claim 13, wherein causing the computer to receive the input address comprises receiving the input address from a user.

15. The computer-readable medium of claim 9, wherein the user type classification comprises at least one of home, business, government, education, and wireless.

16. The computer-readable medium of claim 9, wherein the plurality of data sources comprise demographic and/or firmagraphic data.

* * * * *